US012790121B2

(12) United States Patent
Russo et al.

(10) Patent No.: US 12,790,121 B2
(45) Date of Patent: Nov. 10, 2026

(54) SINGULATION PREPARATION

(71) Applicant: NIAGARA BOTTLING, LLC, Diamond Bar, CA (US)

(72) Inventors: Andrew M. Russo, Alta Loma, CA (US); Cole Pellegrini, Walnut, CA (US)

(73) Assignee: NIAGARA BOTTLING, LLC, Diamond Bar, CA (US)

( * ) Notice: Subject to any disclaimer, the term of this patent is extended or adjusted under 35 U.S.C. 154(b) by 292 days.

(21) Appl. No.: 18/623,325

(22) Filed: Apr. 1, 2024

(65) Prior Publication Data

US 2025/0304375 A1 Oct. 2, 2025

(51) Int. Cl.

*B65G 1/137* (2006.01)
*B65G 1/04* (2006.01)
*B65G 69/28* (2006.01)

(52) U.S. Cl.

CPC ......... *B65G 1/1378* (2013.01); *B65G 1/0485* (2013.01); *B65G 69/28* (2013.01)

(58) Field of Classification Search

CPC ..... B65G 1/1378; B65G 1/0485; B65G 69/28
USPC .......................................................... 414/282
See application file for complete search history.

(56) References Cited

U.S. PATENT DOCUMENTS 4,950,118 A 8/1990 Mueller et al.
4,968,209 A 11/1990 Noble
7,648,329 B2 1/2010 Chilson et al.
7,695,235 B1 4/2010 Rallis
7,980,808 B2 7/2011 Chilson et al.
8,075,243 B2 12/2011 Chilson et al.
8,192,137 B2 6/2012 Ross et al.
8,210,791 B2 7/2012 Chilson et al.
8,965,561 B2 * 2/2015 Jacobus .................. B66F 9/063 700/229

(Continued)

FOREIGN PATENT DOCUMENTS

WO 2001040082 A1 6/2001
WO 2015150404 A1 10/2015

(Continued)

OTHER PUBLICATIONS

International Search Report and Written Opinion for Application No. PCT/US2025/018893 dated May 12, 2025 (10 pages).

*Primary Examiner* — Terrell H Matthews
(74) *Attorney, Agent, or Firm* — MICHAEL BEST & FRIEDRICH LLP

(57) ABSTRACT

A facility may include a loading dock having a dock door, an AGV for operation at the loading dock, a staging area at the loading dock for providing pairs of pallets of finished products, a singulation area at the loading dock, and a control server. The control server configured to receive check in information from a vehicle as the vehicle arrives and checks in at the facility, retrieve load information for the vehicle, the load information including a requirement for a single pallet of the finished product, assign the vehicle to the dock door, instruct the AGV to prepare the single pallet of the finished product in the singulation area after check in of the vehicle, wherein in response to receiving the instructions from the control server, the AGV prepares the single pallet of the finished product in the singulation area prior to the vehicle parking at the dock door.

24 Claims, 5 Drawing Sheets

(56) References Cited

U.S. PATENT DOCUMENTS

| | | | | |
|---|---|---|---|---|
| 10,179,710 | B2 | 1/2019 | Cooper | |
| 10,577,200 | B2 | 3/2020 | Cooper | |
| 10,584,002 | B2 | 3/2020 | Shibata et al. | |
| 10,723,555 | B2 | 7/2020 | Hance et al. | |
| 10,787,315 | B2 | 9/2020 | Hance et al. | |
| 10,815,080 | B2 | 10/2020 | Anderson | |
| 10,822,170 | B2 | 11/2020 | Hance et al. | |
| 11,104,547 | B2 | 8/2021 | Dayrell | |
| 11,124,401 | B1 * | 9/2021 | Jarvis | B65G 1/1373 |
| 11,142,413 | B2 | 10/2021 | Hoofard et al. | |
| 11,402,830 | B2 | 8/2022 | Sullivan et al. | |
| 11,851,310 | B2 | 12/2023 | Yeo et al. | |
| 12,234,111 | B2 | 2/2025 | Hoofard et al. | |
| 12,269,683 | B2 | 4/2025 | Luckay | |
| 12,428,230 | B1 * | 9/2025 | Menassa | B65G 1/1373 |
| 2008/0167817 | A1 * | 7/2008 | Hessler | G01C 21/005<br>701/514 |
| 2009/0293756 | A1 | 12/2009 | Hathaway et al. | |
| 2010/0266381 | A1 | 10/2010 | Chilson et al. | |
| 2014/0086714 | A1 | 3/2014 | Malik | |
| 2018/0060765 | A1 | 3/2018 | Hance et al. | |
| 2019/0039097 | A1 * | 2/2019 | Carpenter | B65G 1/1378 |
| 2019/0066033 | A1 * | 2/2019 | Mains, Jr. | G06Q 10/06311 |
| 2021/0082220 | A1 * | 3/2021 | Boerger | B65G 69/2882 |
| 2021/0276800 | A1 | 9/2021 | Luckay | |
| 2021/0316975 | A1 | 10/2021 | Yeo et al. | |
| 2021/0334736 | A1 * | 10/2021 | Mains, Jr. | G06Q 10/06311 |
| 2021/0347569 | A1 | 11/2021 | Dayrell | |
| 2022/0106123 | A1 | 4/2022 | Holmes et al. | |
| 2022/0144564 | A1 | 5/2022 | Hoofard et al. | |
| 2022/0250841 | A1 | 8/2022 | Dayrell | |
| 2022/0371836 | A1 | 11/2022 | Möllmann et al. | |
| 2022/0396441 | A1 | 12/2022 | Möllmann et al. | |
| 2023/0219761 | A1 | 7/2023 | Garifi et al. | |
| 2023/0257200 | A1 | 8/2023 | Iellimo | |
| 2023/0381822 | A1 | 11/2023 | Kojima et al. | |
| 2024/0190658 | A1 | 6/2024 | Lindbo | |
| 2025/0059010 | A1 | 2/2025 | Rhoads et al. | |

FOREIGN PATENT DOCUMENTS

| | | | | |
|---|---|---|---|---|
| WO | WO-2022042821 | A1 * | 3/2022 | B65G 1/1378 |
| WO | 2024094734 | A1 | 5/2024 | |
| WO | 2024208681 | A1 | 10/2024 | |
| WO | 2024246258 | A1 | 12/2024 | |

* cited by examiner

SINGULATION PREPARATION

FIELD

The present disclosure relates to a system for preparing order requirements of a trailer prior to loading the trailer.

BACKGROUND

Distribution and manufacturing facilities typically include storage areas and a loading dock for loading products onto vehicles or trailers. Automatic/autonomous guided vehicles (AGVs) are used to autonomously move the products to various locations within the distribution and/or manufacturing facility and ultimately onto the trailer at the loading dock for shipment. These AGVs are programmed for all tasks that may be needed throughout a facility in an on-demand basis. Generally, the AGVs begin to retrieve an order for the trailer once the trailer is parked at a dock door of the loading dock.

SUMMARY

In some aspects, the techniques described herein relate to a facility for distributing finished products, the facility including: a loading dock having a dock door; an AGV for operation at the loading dock; a staging area at the loading dock for providing pairs of pallets of finished products; a singulation area at the loading dock; and a control server configured to receive check in information from a vehicle as the vehicle arrives and checks in at the facility, retrieve load information for the vehicle, the load information including a requirement for a single pallet of the finished product, assign the vehicle to the dock door, and instruct the AGV to prepare the single pallet of the finished product in the singulation area after check in of the vehicle. In response to receiving the instructions from the control server, the AGV prepares the single pallet of the finished product in the singulation area prior to the vehicle parking at the dock door.

In some aspects, the techniques described herein relate to a method for loading finished products onto a vehicle from a facility, the method including: receiving check in information from the vehicle as the vehicle arrive and checks in at the facility; retrieving load information for the vehicle, the load information including a requirement for a single pallet of the finished product; assigning the vehicle to a dock door; and instructing an AGV to prepare the single pallet of the finished product in a singulation area after check in of the vehicle. In response to receiving the instructions from the control server, the AGV prepares the single pallet of the finished product in the singulation area prior to the vehicle parking at the dock door.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
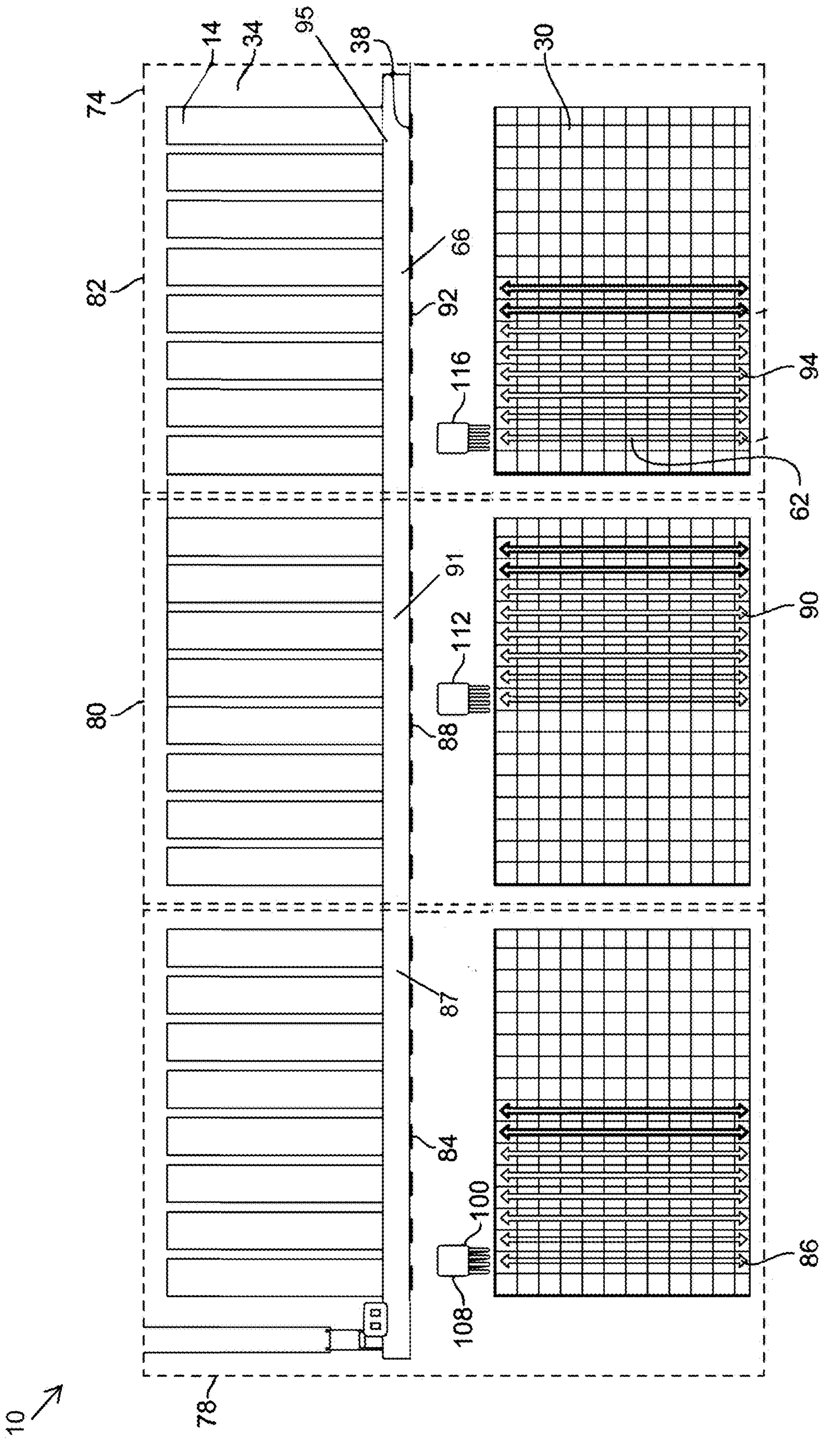
FIG. 1 is a plan view of a facility according to an embodiment of the invention.

FIG. 1 illustrates a distribution facility (hereinafter referred to as a "facility 10"), for staging product and loading the product onto a vehicle such as a trailer 14. In other embodiments, the vehicle may be a van, a truck, semi-trailer truck or a similar vehicle. Specifically, the facility 10 includes a staging area 30 where pallets of finished products are arranged prior to loading (either directly from a production line or from an intermediary storage area), and a loading dock 34 including dock doors 38 to accommodate the trailers 14 for loading pallets of finished products from the staging area 30 onto the trailers 14 through the dock doors 38. The pallets of finished products are movable within the facility 10 via AGVs 100. In some embodiments, the facility 10 may additionally produce the pallets of finished products. In other embodiments, the facility 10 may solely distribute the pallets of finished products. In such embodiments, the pallets of finished products are produced at an offsite location.

The staging area 30 includes a plurality of staging lanes 62 of the pallets of finished products. The staging lanes 62 are stocked with the pallets of finished products from elsewhere in the facility 10 to await loading into the trailers 14 assigned to the dock doors 38 of the loading dock 34. The pallets of finished products are delivered to the staging lanes 62 via the AGVs 100. The pallets of finished products are arranged in pairs in the staging lanes 62 to allow the AGVs 100 to pick up and transport the pallets of finished products in pairs. Specifically, the AGVs 100 pick up two of the pallets of finished products at a time. The dock doors 38 are arranged in series along a first direction and each of the staging lanes 62 are arranged along a second direction orthogonal to the first direction. The staging lanes 62 are stocked such that a first pair of pallets of the pallets of finished products that is stocked in a staging lane 62 is the first pair of pallets removed from the staging lane 62 into the loading dock 34 for loading onto the trailer 14. In other words, the pallets of finished products are removed from the staging area 30 in the order that the pallets of finished products entered the staging area 30. In some embodiments, each of the staging lanes 62 stocks a dedicated product such that each of the staging lanes 62 solely stores a single type of product or SKU. In other embodiments, a single staging lane can include multiple types of products or SKUs.

The loading dock 34 additionally includes singulation areas 66. The singulation areas 66 are used to stage pairs of pallets of similar products (or SKUs) to allow the AGVs 100 to pick up single or mixed pair pallets of the pallets of finished products. Once the AGVs 100 pick up the single or mixed pair pallets, the remaining pallets of finished products await a future need, as described below. The single pallets define a single pallet rather than a pair of pallets. The mixed pair pallets define a first pallet having a first product (or SKU) and a second pallet having a second product (or SKU). Since the pallets of finished products are arranged in identical pairs in the staging lanes 62, single or mixed pair pallets are retrievable from the singulation areas 66 after being converted in the singulation racks. For example, when the trailer 14 requires a single pallet of finished products or one pallet of first finished products and one pallet of second finished products, the single or mixed pallets of finished products are delivered from the singulation areas 66. In some embodiments, the singulation areas 66 may be a single-level rack disposed above the dock doors 38. In other embodiments, the singulation areas 66 may be a multi-level rack disposed adjacent the dock doors 38. For example, one of the singulation areas 66 may be disposed in a gap between the dock doors 38. In further embodiments, the singulation areas 66 may be disposed in alternative locations. In further embodiments, the loading dock 34 may include a single singulation area 66. The singulation areas 66 define multi-level racks for storing the pallets of finished products at multiple vertically arranged levels. In other embodiments, the singulation areas 66 may solely store the pallets of finished products in a single level, either on a single-level rack or on the floor.

The loading dock 34 includes the dock doors 38. The dock doors 38 are arranged in series along the first direction such that the dock doors 38 face the staging area 30. Each of the dock doors 38 accommodates one trailer 14 at a time. Before the trailer 14 arrives at the loading dock 34, the trailer 14 checks in at a yard gate and information relative to the trailer 14 is entered into to a loading control system. The loading control system, which will be described in more detail below, determines the order requirements of the trailer 14 and assigns the trailer 14 to one of the dock doors 38 according to the order requirement.

The staging lanes 62, the loading dock 34, and the singulation areas 66 are divided into a plurality of loading zones 74. More specifically, each of the plurality of loading zones 74 includes a subset of the staging lanes 62, a corresponding subset of the dock doors 38, and a singulation area 66. Each of the loading zones 74 may include any number of the staging lanes 62, any number of the dock doors 38, and any number of singulation areas 66. As an example, the plurality of loading zones 74 include a first loading zone 78, a second loading zone 80 and a third loading zone 82. The first loading zone 78 includes a first subset of the dock doors 84, a first subset of staging lanes 86 located proximate to the first subset of dock doors 84, and a first singulation area 87 for supplying pallets of finished products for loading into trailers 14 docked at the first subset of the dock doors 84. The second loading zone 80 includes a second subset of the dock doors 88, a second subset of staging lanes 90 located proximate to the second subset of the dock doors 88, and a second singulation area 91 for supplying pallets of finished products for loading into trailers 14 docked at the second subset of the dock doors 88. The third loading zone 82 includes a third subset of dock doors 92 and a third subset of staging lanes 94 located proximate to the third subset of dock doors 92, and a third singulation area 95 for supplying pallets of finished products for loading into trailers 14 docked at the third subset of the dock doors 92. In some embodiments, the facility 10 includes more than three loading zones 74. In other embodiments, the facility 10 includes three loading zones 74 or less than three loading zones 74. For example, the facility 10 may solely include a single zone. In other embodiments, the singulation area 66 may be defined in a gap between the subset of dock doors 38 between the loading zones 74. For example, one of the singulation areas 66 may be disposed in a gap between the first subset of the dock doors 84 and the second subset of the dock doors 88. The singulation area 66 may be designated to either the first loading zone 78, the second loading zone 80, or both the first loading zone 78 and the second loading zone 80. In other embodiments, the singulation areas 66 may be disposed in alternative areas within the facility 10. In other embodiments, the singulation areas 66 may not correlate with the loading zones 74. In such embodiments, loading zones 74 may share the singulation areas 66.

Each of the loading zones 74 includes one of the AGVs 100 for loading the trailers 14 assigned to the subset of the dock doors 38 with pallets of finished products taken from the corresponding subset of staging lanes 62 and singulation areas 66. More specifically, the first loading zone 78 includes a first AGV 108, the second loading zone 80 includes a second AGV 112, and the third loading zone 82 includes a third AGV 116. The AGVs 100 move the pallets of finished products in pairs from the staging lanes 62 into the trailers 14 for loading onto the trailers 14. In some embodiments, the AGVs 100 may load the pallets of finished products from both the staging lanes 62 and the singulation areas 66. In other embodiments, a first subset of the AGVs 100 may be assigned with solely loading the pallets of finished products from the staging lanes 62 and a second subset of the AGVs 100 may be assigned with solely loading the pallets of finished products from the singulation areas 66. The AGVs 100 include two vertically actuable forks used to lift the pairs of pallets. Each of the AGVs 100 includes a left fork and a right fork positioned side-by-side with each other such that each fork is capable of lifting a pallet. In this way, each AGV can lift and move a pair of pallets (i.e., one pallet on each of the left and right forks) or a single pallet (e.g., one pallet on either the left fork or the right fork).

The AGVs 100 additionally stock the staging lanes 62 with the pallets of finished products. In some embodiments, the AGVs 100 assigned with stocking the staging lanes 62 also load the trailers 14 with the pallets of finished products. In other embodiments, a first subset of the AGVs 100 may be solely assigned with stocking the staging lanes 62 and a second subset of the AGVs 100 may be solely assigned with loading the trailers 14 with the pallets of finished products.

The AGVs 100 additionally stage the singulation areas 66 with the pairs of pallets of similar products (or SKUs) to allow the AGVs 100 to pick up the single or mixed pair pallets. In some embodiments, the AGVs 100 assigned with staging the singulation areas 66 may also stock the staging lanes 62 and load the tailers with the pallets of finished products. In other embodiments, the AGVs 100 assigned with staging the singulation areas 66 may also stock the staging lanes 62 but not load the trailers 14 with the pallets of finished products. In further embodiments, the AGVs 100 assigned with stocking the singulation areas 66 may solely stock the singulation areas 66.

When staging the singulation areas 66 to retrieve a single pallet, if the desired single pallet is not already disposed in the singulation area 66, the AGVs 100 move the pallets of finished products in pairs from a storage area to the singulation area 66. The AGV 100 places the pair of finished products on the singulation area 66 such that a space is left on a side of the pair of finished products. When the AGV 100 picks up the pallet of finished products from the singulation areas 66 for transportation onto the trailer 14, the AGV 100 positions itself such that one of the pairs of vertically actuable forks is positioned under the pallet of finished products and the other of the pairs of vertically actuable forks is positioned in the space. Therefore, the AGV 100 solely picks up one pallet of finished products. The other pallet of finished products in the pair is left on the singulation areas 66 for future use. For example, when a single pallet is needed that matches the SKU of the other pallet, the AGV 100 simply uses the other pallet. In other words, the other pallet is used to create the single pallet once the other pallet is needed.

When staging the singulation areas 66 to retrieve a pallet in the mixed orientation, if the mixed pallets are not already disposed in the singulation area 66, the AGVs 100 move the pallets of finished products in pairs from the storage area to the singulation area 66. The AGV 100 places a first pair of finished products on the singulation area 66 with two spaces open to a side of the first pair of finished products. The AGV 100 places a second pair of finished products in the two spaces such that the second pair of finished products is adjacent the first pair of finished products. When the AGV 100 picks up the mixed pair pallets, the AGV 100 positions itself such that one of the pairs of vertically actuable forks is positioned under the first pair of finished products and the other of the pairs of vertically actuable forks is positioned under the second pair of finished products. Therefore, the AGV 100 picks up a pallet of the first pair of finished products and a pallet of the second pair of finished products. The unused pallets of the first pair of finished products and the second pair of finished products are left in the singulation area 66. For example, when mixed pallets are needed that match the SKUs of the unused first and second pairs of finished products, the AGV 100 simply uses the unused first and second pairs of finished products. In other words, the unused pallets of the first and second pairs of finished products are used to create the mixed pallets once the mixed pallets are again needed.

Each of the AGVs 100 includes a drive system, a rechargeable battery, and a AGV controller that controls operations of the AGV 100. The AGV controller includes one or more electronic processors, non-volatile and volatile memory, and a communication interface. The communication interface is configured to wirelessly communicate with a control server 120. The control server 120 is in communication with each of the AGVs 100 to provide instructions to each of the AGVs 100 to perform tasks requiring movement within each AGV's corresponding loading zone. In one example implementation, the AGVs 100 may each be an E80® AGV, the control server 120 may be utilizing the software platform SM.I.LE80 from E80® to control the AGVs 100, and the wireless communication occurs via Wi-Fi or other suitable wireless communication. In other embodiments, instructions may be uploaded onto the AGV 100 such that the communication interface communicated with the control server 120 through a wired connection.

Movement of the AGV 100 is constrained to a single loading zone 74 such that the AGV 100 can solely pick up the pallets of finished products from the subset of staging lanes 62 and the singulation area 66 in the loading zone 74 and deliver the pallets of finished products to the trailers 14 corresponding to the dock doors 38 within the loading zone 74. Further, the AGV 100 can solely stock the pallets of finished products to the singulation area 66 in the loading zone the AGV 100 is assigned. In this manner, each loading zone defines a designated area within the facility 10 for limiting the travel of its corresponding AGV 100. Each loading zone defines a designated area of the facility that is different, and in some cases isolated from, the other loading zones. In further embodiments, the AGVs 100 may not be constrained to a particular zone. For example, the AGVs 100 may stock and pick up the pallets of finished products from multiple zones.

Figure 2:
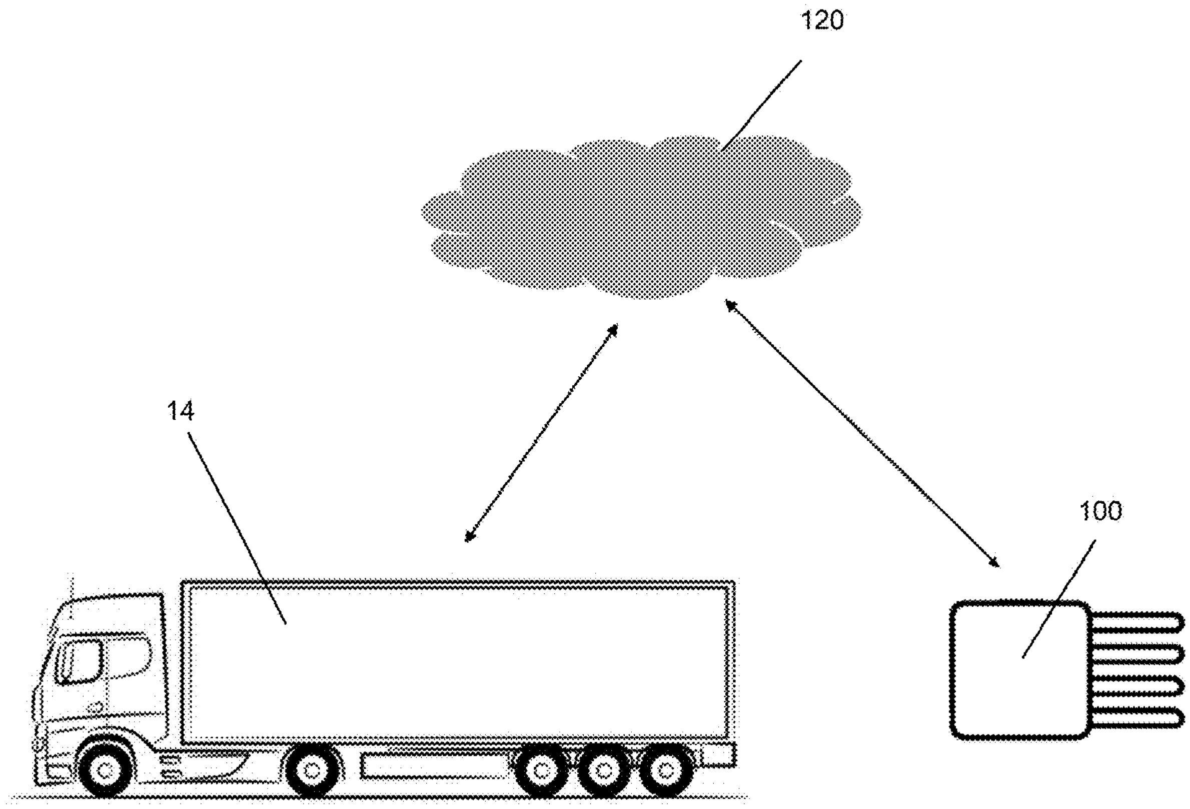
FIG. 2 is a schematic view of a control system of the facility of FIG. 1, according to an embodiment of the invention.

With reference to FIG. 2, the facility additionally includes the control server 120 for controlling operation of the facility. In some embodiments, the control server 120 is a cloud based platform, such as the software platform SM.I.LE80. In other embodiments, the control server 120 may utilize an alternative platform. The control server 120 assigns the trailers 14 to the dock doors 38 and controls operation of the AGVs 100. To receive a dock door assignment, the trailer 14 checks into the control server 120. Check in may be accomplished electronically. For example, when the trailer 14 is in the yard, a driver of the trailer 14 may check in via a mobile or cellular application. In other embodiments, the driver may check in with an operator located in the yard. The operator may be an electronic computer or a person.

Figure 3:
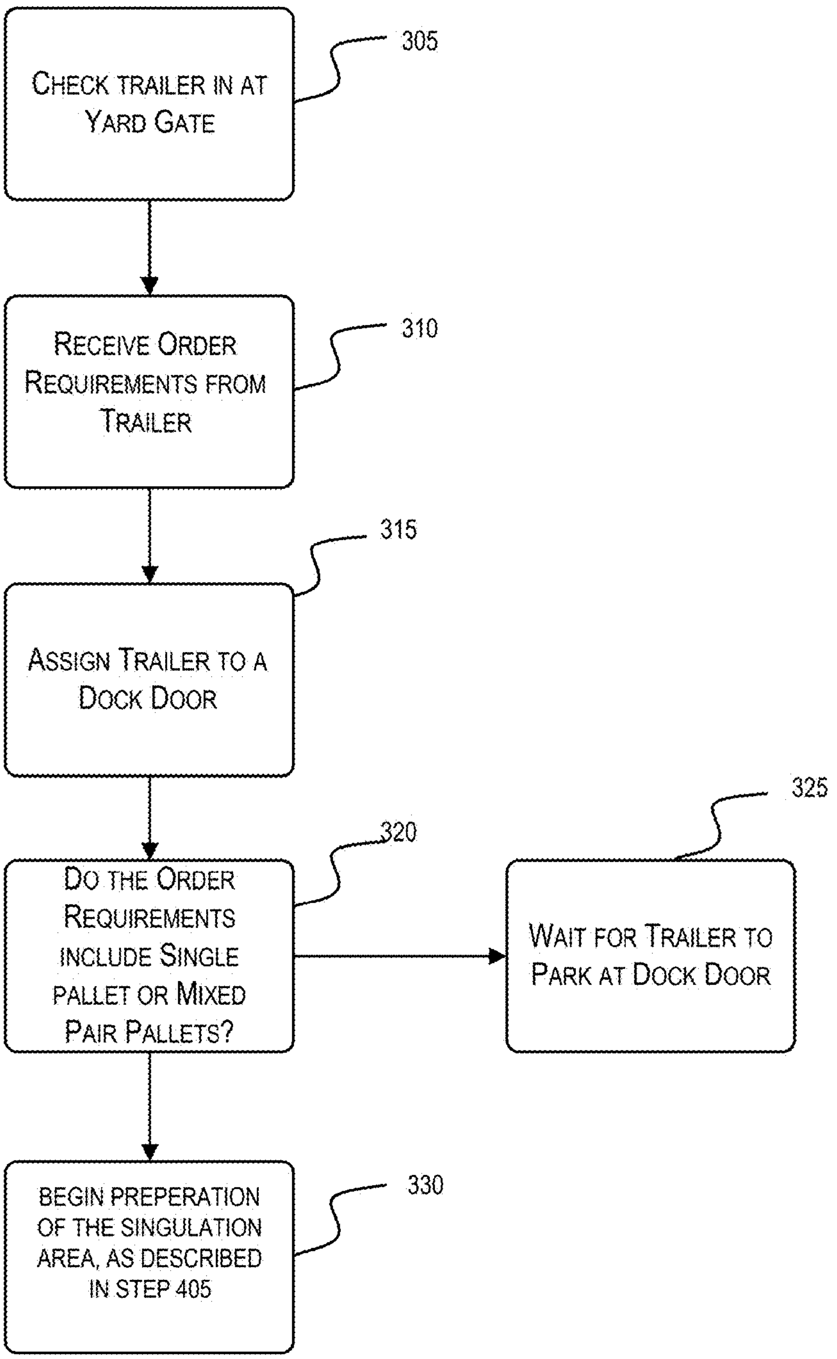
FIG. 3 is a flow chart for checking in a trailer into the facility of FIG. 1, according to an embodiment of the invention.

In operation, as shown in FIG. 3, the trailer 14 checks in at the yard gate and the control server 120 is alerted that the trailer 14 is in the yard (Step 305). The control server 120 retrieves order requirements from the trailer 14 (Step 310). The control server 120 assigns the trailer 14 to one of the dock doors 38 (Step 315). The control server 120 determines if the order requirements include single and/or mixed pair pallets (Step 320). If the order requirements do not include single or mixed pair pallets, the control server 120 waits for the trailer 14 to park at the assigned dock door 38 (Step 325) to begin loading pairs of pallets of finished product. If the order requirements include a single pallet and/or a mixed pallet, the control server 120 instructs the AGV 100 assigned to the loading zone in which the assigned dock door 38 is located to begin preparation of the singulation area 66 in that zone (Steps 330, 405).

Figure 4:
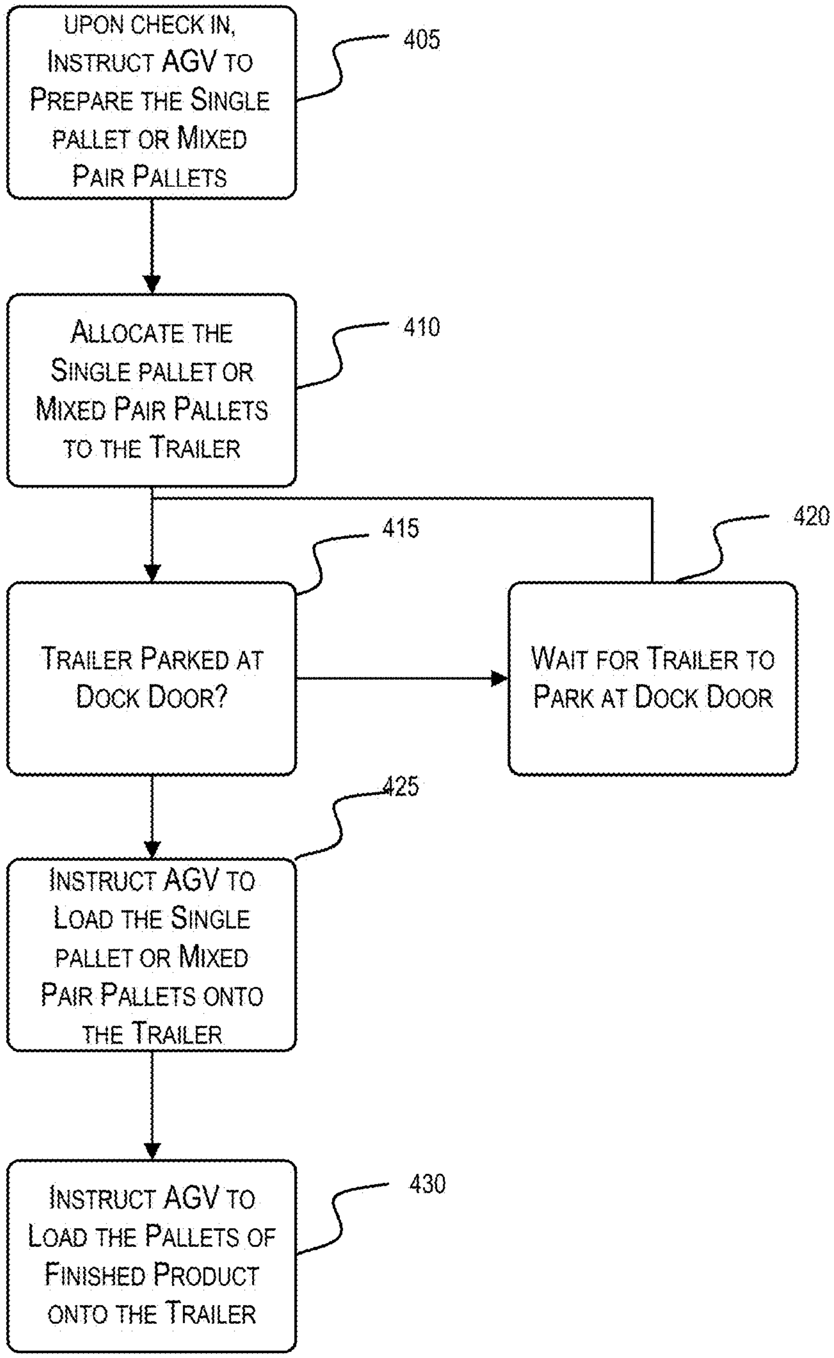
FIG. 4 is a flow chart for loading the trailer of FIG. 3, according to an embodiment of the invention.

With reference to FIG. 4, the control server 120 instructs the AGV 100 immediately upon check in to begin moving the pallets of finished products from the staging area 30 to the singulation area 66 to create single or mixed pair pallets (Step 405). The AGV 100 does not wait for the trailer 14 to arrive at the dock door 38. Therefore, preparation of the single or mixed pair pallets can be completed or nearly completed when the trailer 14 arrives at the dock door 38. By preparing the single or mixed pair pallets in advance of the trailer 14 parking at the dock door 38, loading of the trailer 14 is expedited since the trailer 14 does not have to wait for the single or mixed pair pallets to be prepared while the trailer 14 is parked and the loading process has begun. Once the single or mixed pair pallets disclosed in the order requirements are prepared in the singulation area 66, the control server 120 allocates the single or mixed pair pallets to that particular trailer 14 (Step 410). Therefore, the single or mixed pair pallets cannot be used for an alternative trailer 14 and awaits loading of the trailer 14 to begin.

Figure 5:
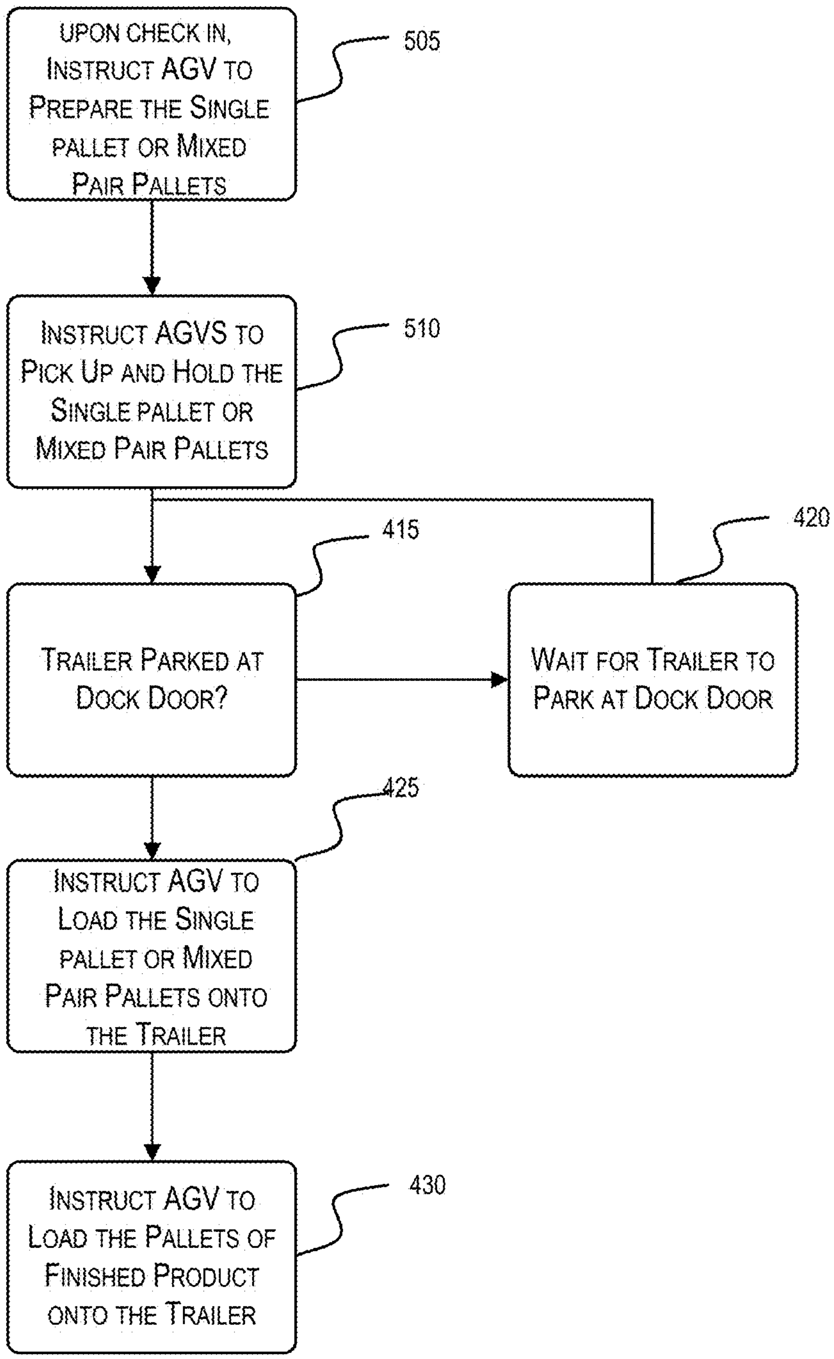
FIG. 5 is a flow chart for loading the trailer of FIG. 3, according to an embodiment of the invention.

With reference to FIG. 5, in some embodiments, the AGV 100 may be instructed to prepare the single or mixed pair pallets in the singulation area 66 (Step 505) and immediately pick up the single or mixed pair pallets (Step 510). The AGV 100 removes and holds the single or mixed pair pallets until loading of the trailer 14 begins. Once loading begins, the AGV 100 immediately drives into the trailer 14 to deposit the single or mixed pair pallets. This is particulary applicable when the first load onto the trailer is the single or mixed pair pallets. In some embodiments, the AGV 100 holds the single or mixed pair pallets in close proximity to the dock door 38 and such that the AGV 100 can immediately drive forward and enter the parked trailer when it is ready for loading to begin.

With renewed reference to FIG. 4, the control server 120 determines if the trailer 14 is parked at the dock door 38 (Step 415). If the trailer 14 is not parked at the dock door 38, the control server 120 waits for the trailer 14 to be parked at the dock door 38 before beginning loading (Step 420). If the trailer 14 is parked at the dock door 38 and ready to receive a load, the control server 120 instructs the AGV 100 to begin loading the trailer 14. The control server 120 instructs the AGV 100 to retrieve the single or mixed pair pallets from the singulation area 66 in the AGV's loading zone 74 based on the order requirements of the trailer 14 and load the pallets of finished products in the trailer 14 (Step 425). The control server 120 instructs the AGV 100 to retrieve the pallets of finished products from the staging lanes 62 in the AGV's loading zone 74 based on the order requirements of the trailer 14 and load the pallets of finished products in the trailer 14 (Step 430). Once the pallets of finished products corresponding to the order requirement have all been loaded onto the trailer 14, the trailer 14 leaves the dock door 38 and exits the yard. The loading order of paired pallets and single or mixed pallets can vary based on order requirements such that the single or mixed pallets may need to be loaded into the trailer 14 first, last, or anywhere in between. In addition, the order requirements may include one or more single pallets, one or more mixed pallets, or any combination of single pallets and mixed pallets, for which preparation will begun in the singulation area 66 prior to the trailer 14 parking at the dock door 38. In other embodiments, the preparation of all the single and mixed pallets listed in the order requirements is completed prior to the trailer 14 parking at the dock door 38.

Although the disclosure has been described in detail with reference to preferred implementations, variations and modifications exist within the scope and spirit of one or more independent aspects of the disclosure as described. More particularly, one of ordinary skill in the art will understand the scalability of the above-described facility.

What is claimed is:

1. A facility for distributing finished products, the facility comprising:

a loading dock having a dock door;

an AGV for operation at the loading dock;

a staging area at the loading dock for providing pairs of pallets of finished products;

a singulation area at the loading dock; and a control server configured to receive check in information from a vehicle as the vehicle arrives and checks in at the facility, retrieve load information for the vehicle, the load information including a requirement for a single pallet of the finished product, assign the vehicle to the dock door, instruct the AGV to prepare the single pallet of the finished product in the singulation area after check in of the vehicle, wherein in response to receiving the instructions from the control server, the AGV prepares the single pallet of the finished product in the singulation area prior to the vehicle parking at the dock door.

2. The facility of claim 1, wherein the singulation area defines a singulation rack disposed above the dock door.

3. The facility of claim 1, wherein the singulation area defines an area of a floor of the loading dock.

4. The facility of claim 1, wherein the control server is configured to instruct the AGV to remove the single pallet from the singulation area and hold the single pallet after the single pallet of the finished product is prepared, wherein in response to receiving the instructions from the control server, the AGV removes the single pallet of the finished product from the singulation area and holds the single pallet of the finished product prior to the vehicle parking at the dock door.

5. The facility of claim 4, wherein the control server is configured to instruct the AGV to load the single pallet of the finished product onto the vehicle, wherein after receiving instructions, the AGV loads the single pallet onto the vehicle after the vehicle is parked at the dock door.

6. The facility of claim 1, wherein the control server is configured to instruct the AGV after the vehicle is parked at the dock door to remove the single pallet from the singulation area and load the single pallet onto the vehicle, wherein in response to receiving the instructions from the control server, the AGV removes the single pallet of finished product from the singulation area after the vehicle is parked at the dock door and loads the single pallet of finished products onto the vehicle.

7. The facility of claim 1, wherein after receiving instructions from the control server to prepare the single pallet of finished products, the AGV removes a pair of pallets of the finished product from the staging area and positions the pair of pallets of the finished product in the singulation area.

8. The facility of claim 1, wherein the control server instructs the AGV to load a pair of pallets of finished product from the staging area onto the vehicle, wherein after receiving instructions from the control server, the AGV removes the pair of pallets of the finished product from the staging area and loads the pair of pallets of the finished product onto the vehicle.

9. The facility of claim 1, wherein the load information includes a requirement for a mixed pallet of the finished product, wherein the control server is configured to instruct the AGV to prepare the mixed pallet of the finished product in the singulation area after check in of the vehicle, and wherein in response to receiving the instructions from the control server, the AGV prepares the mixed pallet of the finished product in the singulation area prior to the vehicle parking at the dock door.

10. The facility of claim 9, wherein after receiving instructions from the control server to prepare the mixed pallet of finished products, the AGV removes a pair of pallets of the finished product of a first type from the staging area, positions the pair of pallets of the finished product of the first type in the singulation area, removes a pair of pallets of the finished product of a second type from the staging area, positions the pair of pallets of the finished product of the second type in the singulation area next to the pair of pallets of the finished product of the first type.

11. A method for loading a vehicle at a facility, the method comprising:

providing pairs of pallets of finished products in a staging area;

receiving check in information from the vehicle as the vehicle arrives and checks in at the facility;

retrieving load information for the vehicle, the load information including a requirement for a single pallet of the finished product;

assigning the vehicle to a dock door; and instructing an AGV to prepare the single pallet of the finished product in a singulation area after check in of the vehicle, after receiving the instructions, preparing the single pallet of the finished product in the singulation area with the AGV prior to the vehicle parking at the dock door.

12. The method of claim 11, wherein preparing the single pallet of finished product in the singulation area includes preparing the single pallet of finished product in a singulation area disposed above the dock door.

13. The method of claim 11, wherein preparing the single pallet of finished product in the singulation area includes preparing the single pallet of finished product in an area of a floor of the loading dock.

14. The method of claim 11, further comprising instructing the AGV to remove the single pallet from the singulation area and hold the single pallet after the single pallet of the finished product is prepared, and after receiving the instructions, removing the single pallet of the finished product from the singulation area with the AGV and holding the single pallet of the finished product with the AGV prior to the vehicle parking at the dock door.

15. The method of claim 14, further comprising instructing the AGV to load the single pallet of the finished product onto the vehicle, and after receiving instructions, loading the single pallet onto the vehicle with the AGV after the vehicle is parked at the dock door.

16. The method of claim 11, further comprising instructing the AGV after the vehicle is parked at the dock door to remove the single pallet from a singulation area and load the single pallet onto the vehicle, after receiving the instructions, removing the single pallet of finished product from the singulation area with the AGV after the vehicle is parked at the dock door, and loading the single pallet of finished products onto the vehicle.

17. The method of claim 11, further comprising after receiving instructions, removing a pair of pallets of the finished product from a staging area with the AGV and positioning the pair of pallets of the finished product in the singulation area with the AGV prior to the vehicle parking at the dock door.

18. The method of claim 11, further comprising instructing the AGV to load a pair of pallets of finished product from a staging area onto the vehicle, and after receiving instructions, removing the pair of pallets of the finished product from the staging area with the AGV and loading the pair of pallets of the finished product with the AGV onto the vehicle.

19. The method of claim 11, further comprising instructing the AGV to prepare a mixed pallet of the finished product in the singulation area after check in of the vehicle, and after receiving the instructions, preparing the mixed pallet of the finished product in the singulation area with the AGV prior to the vehicle parking at the dock door.

20. The method of claim 19, further comprising after receiving instructions, removing a pair of pallets of the finished product of a first type from a staging area with the AGV, positioning the pair of pallets of the finished product of the first type in the singulation area with the AGV, removing a pair of pallets of the finished product of a second type from the staging area with the AGV, positioning the pair of pallets of the finished product of the second type in the singulation area next to the pair of pallets of the finished product of the first type with the AGV.

21. A facility for distributing finished products, the facility comprising:

a loading dock having a dock door;

an AGV for operation at the loading dock;

a staging area at the loading dock for providing pairs of pallets of finished products;

a singulation area at the loading dock; and a control server configured to receive check in information from a vehicle as the vehicle arrives and checks in at the facility, retrieve load information for the vehicle, the load information including a requirement for a mixed pallet of the finished product, assign the vehicle to the dock door, instruct the AGV to prepare the mixed pallet of the finished product in the singulation area after check in of the vehicle, wherein in response to receiving the instructions from the control server, the AGV prepares the mixed pallet of the finished product in the singulation area prior to the vehicle parking at the dock door.

22. The facility of claim 1, wherein the control server is further configured to receive the check in information from the vehicle while the vehicle is in a yard of the facility prior to the vehicle parking at the dock door.

23. The method of claim 11, wherein receiving the check in information from the vehicle includes receiving the check in information from the vehicle while the vehicle is in a yard of the facility prior to the vehicle parking at the dock door.

24. The facility of claim 21, wherein the control server is further configured to receive the check in information from the vehicle while the vehicle is in a yard of the facility prior to the vehicle parking at the dock door.

* * * * *